W. S. SUTTON.
COUPLING.
APPLICATION FILED DEC. 11, 1912.
1,088,847.
Patented Mar. 3, 1914.
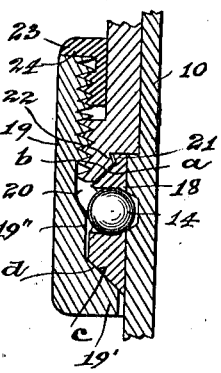
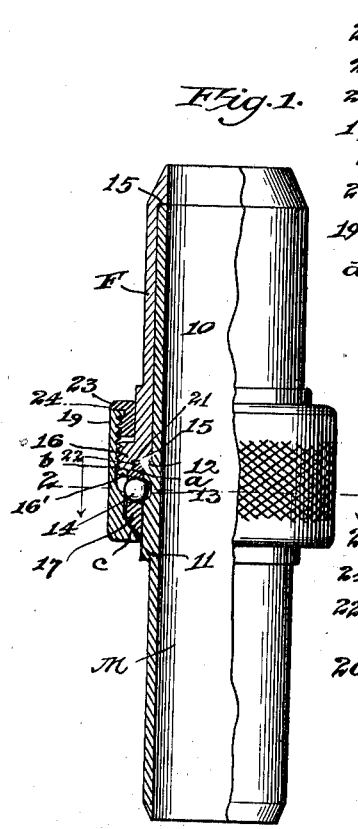
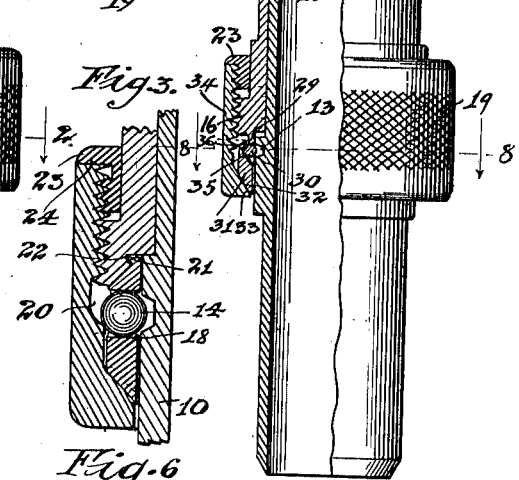
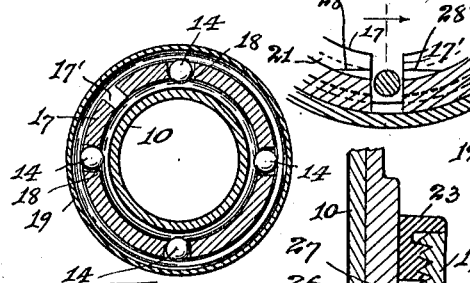
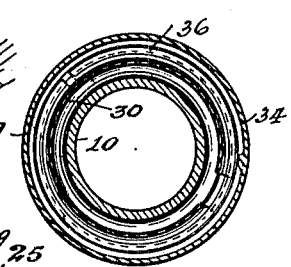
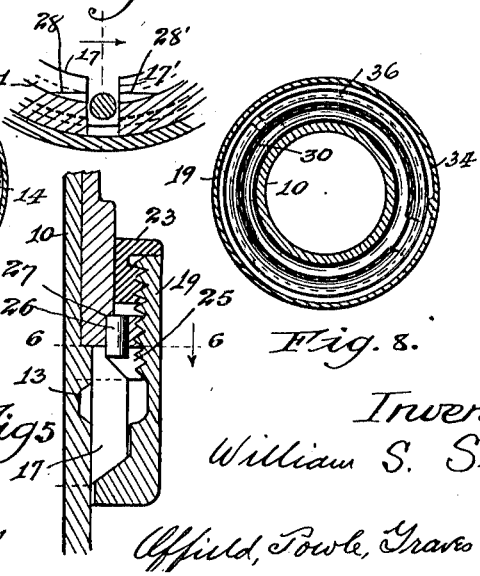
Witnesses,
Inventor,
William S. Sutton.
By Offield, Towle, Graves & Offield.
Attys.

UNITED STATES PATENT OFFICE.

WILLIAM S. SUTTON, OF ROCKFORD, ILLINOIS, ASSIGNOR TO AMERICAN RADIATOR COMPANY, OF CHICAGO, ILLINOIS, A CORPORATION OF NEW JERSEY.

COUPLING.

1,088,847. Specification of Letters Patent. Patented Mar. 3, 1914.

Application filed December 11, 1912. Serial No. 736,110.

*To all whom it may concern:*

Be it known that I, WILLIAM S. SUTTON, a resident of Rockford, in the county of Winnebago and State of Illinois, have invented certain new and useful Improvements in Couplings, of which the following is a specification.

My invention relates to improvements in couplings and particularly to adjustable couplings for locking together two cylindrical members against separation, either rigidly to prevent any relative axial movement or more or less yieldingly for such relative axial movement.

Although my improved coupling can be used in a great many ways, it is particularly adaptable for use in connection with suction cleaning devices to be interposed in the nozzle supporting handle between the tool supporting section thereof and the hose receiving section. Under certain conditions of application of the nozzle to objects to be cleaned, it is desirable that the nozzle be free to follow the surface to be cleaned in order that its nozzle outlet may be intimately closed over the surface to thus prevent leakage and to operate in the most efficient manner. It is therefore desirable that the tool end of the handle be at all times free to rotate axially with reference to the hose supporting section of the handle which is firmly grasped by the operator, the nozzle then automatically accurately following and seating itself against the surface to be cleaned without effort on the part of the operator. As the operator is not required to continually axially rotate the handle in accordance with the varying angularity or curvature of the surface, the cleaning device can be operated with greater ease and without tiring the operator, and in addition more efficient results are obtained. Under other conditions of operation, it would be more desirable to have the nozzle rigid.

An important feature of my invention therefore resides in such construction of the coupling that the slight turning of an adjusting member in one direction will effect rigid locking together of the coupling members and therefore rigid connection of the nozzle and hose ends of the handle structure, and so that a slight turning in the opposite direction will effect release of the coupling members to a greater or less degree so that the nozzle end of the coupling is free to rotate axially.

As it may also be desirable under certain conditions to entirely disconnect the coupling members and their supporting structures, another feature of the invention is therefore to provide for such ready disconnection. Where the coupling is used in connection with suction sweepers, one member thereof may form a permanent part of the nozzle section and the coupling arrangement is such that upon slight movement of an adjusting member the coupling members are entirely separable so that different nozzle structures can be interchangeably quickly coupled to the main handle section.

Another important feature of the invention is to provide ball bearing engagement for the members of the coupling so that friction is reduced to a minimum when the members are free for relative axial rotation.

Another feature is to utilize the ball bearing parts for preventing uncoupling of the coupling members when they are adjusted for free relative axial rotation, and another feature of the invention resides in such interrelation of the various parts that the coupling members can be readily uncoupled without danger of parts, particularly the bearing balls becoming disarranged or dropping out.

In general the construction is such that the adjusting member is in the form of a ring surrounding the juncture of the coupling members and which when turned in one direction will allow ready uncoupling of the members, and which when turned a distance in the opposite direction will prevent uncoupling of the members but will allow more or less free relative axial rotation thereof, and which when turned farther will effect rigid coupling together of the members so that there can be no relative movement of any kind.

Referring to the drawings which clearly illustrate the construction and operation of a coupling embodying all the features of the invention Figure 1 is an elevational view of a coupling, one-half thereof being in diametral vertical section. Fig. 2 is a sectional view taken on plane 2—2, Fig. 1, Fig. 3 is an enlarged sectional view showing the parts adjusted for coupling the members together but for allowing relative rotation thereof, Fig. 4 is a similar sectional view but showing the parts adjusted to lock the coupling members against any relative movement when the coupling is in service, Fig. 5 is an enlarged sectional view showing certain stop mechanism for preventing undesired following movement of a clamping ring, Fig. 6 is a sectional view taken on plane 6—6, Fig. 5, Fig. 7 is a view similar to Fig. 1 but showing a modified arrangement, and Fig. 8 is a sectional view taken on plane 8—8, Fig. 7.

The male member M of the coupling is in the form of a tubular length 10 having a diametrically enlarged belt 11 near the middle thereof which is provided near its top shoulder 12 with the annular groove 13 which flares outwardly and forms a runway for bearing balls 14. The female member F of the coupling is also tubular and of an internal diameter to snugly receive the end of the coupling member M above the shoulder 12, the lower end of the female member abutting against said shoulder when the members are in coupling position, and the upper end of the female member being of reduced diameter to provide the internal shoulder 15 against which the upper end of the male member abuts when the members are in coupling position. The snug engagement of the coupling members at their sides and at their ends with the shoulders 12 and 15 will effectively seal the coupling against leakage. For example where the coupling member is interposed in the coupling handle of a suction sweeping device there would be no leakage. The lower end of the female member has a flange 16 whose lower section 16' extends a distance below the end of the female member which engages the shoulder 12 and which is of somewhat greater diameter than the external diameter of the belt section 11 of the male member. The inner side of this flange section is chamfered to form with the opposite surface of the belt 11 a wedging pocket.

The balls 14 are supported in a clamping ring 17 in suitable pockets provided therein. These pockets are drill holes of slightly greater diameter than the balls to allow free movement therein and the inner edges of these holes are turned over slightly as at 18 to prevent passage of the balls entirely through the holes inwardly. The upper outer edge of the clamping ring is beveled to provide a wedge surface $a$ for engaging with the chamfer surface $b$ of the flange section 16'. The lower edge of the clamping ring is also beveled and provides a wedging surface $c$ for being engaged by the chamfer surface $d$ on the flange 19' at the lower end of the adjusting sleeve 19 which is internally threaded to engage with external threads on flange 16. This adjusting sleeve is suitably knurled or otherwise roughened on its periphery so that it may be readily rotated. It is evident that when this sleeve is rotated in one direction it will be drawn toward the flange 16 on the female member thus drawing the wedging surfaces $b$ and $d$ together and against the wedging surfaces $a$ and $c$ on the clamping ring, this clamping ring being open at a gap 17' so that upon such wedging engagement it will radially contract and bind more or less against the belt 11 of the male member.

Figs. 1 and 4 show the clamping ring securely clamped against the belt 11 to rigidly lock the coupling members against relative rotation. When the ring is thus tightly clamped, the lower section 19'' of the adjusting sleeve will be in front of the balls to prevent escape of the balls from the runway 13 so that the coupling members are also rigidly locked against separation. Above this section 19'' the sleeve is of increased diameter to form the annular pocket 20 which will allow outward movement of the balls when the sleeve is turned to move away from the female member flange 16. Such condition is illustrated in Fig. 3. The sleeve has been turned sufficiently to withdraw its wedging surface $d$ from the clamping ring so the coupling members will no longer be locked against axial rotation. However, the adjusting sleeve has not been turned sufficiently to carry the section 19'' sufficiently away from the balls to allow the balls to entirely leave the run-way 13, the balls still being confined to project loosely into the run-way so that although the coupling sections may freely rotate axially they will be prevented from being pulled apart. If now, the adjusting sleeve is rotated still farther, section 19'' will be entirely removed from the path of the balls and these balls may fall into pocket 20 and entirely away from the run-way so that the coupling members may be readily pulled apart. After such separation of the coupling members, the balls cannot fall from their pockets on account of their retaining bur 18.

In order that the clamping ring may be held in proper position when the adjusting ring is loosened, the upper edge of the ring has a retaining flange 21 for engaging in the annular recess 22 provided at the base of the chamfered surface $b$ on flange 16 of the female member. The top of the clamping ring is also spaced away a distance from the lower edge of the female member when the ring is expanded so that its wedge surface $a$ can slide along the surface $b$ when the adjusting sleeve is tightened. When the adjusting sleeve is loosened and the coupling members separated, the clamping ring will be confined on the female member by its retaining flange and the balls will be confined on the ring as described so that when the coupling members are again brought together the parts are in their proper operative position to enable accurate adjustment. In order to prevent entire removal of the adjusting ring and also to give a more finished appearance, a retainer nut 23 threads into the end of the adjusting ring, its flange 24 abutting against and overlying the ring edge to give a finished appearance. The lower edge of the ring will abut against the flange 16 after the adjusting ring has been withdrawn to allow free separation of the coupling members, and further withdrawing movement of the adjusting ring will then be prevented.

It is desirable to prevent rotation of the clamping ring as adjustment is made so as to have relative rotational movement only between the wedging surfaces $c$ and $d$, wearing of the upper end of the clamping ring against the flange 16 being then prevented. As shown in Figs. 5 and 6, the flange part 16' has the slot 25 into which extends a stop pin 26 which is anchored in a hole 27 provided in the upper part of the flange 16 above the slot 25. The lower end of the pin projects into the gap 17' of the clamping ring and between the end of the detent flange 21 so that the ring will be locked to the flange 16 and will not rotate upon operation of the adjusting sleeve. In order to assist in forcing the clamping ring against the belt 11 to prevent any relative rotation of the coupling members, the ends of this detent flange are tapered away as best shown in Fig. 6, to leave the surfaces 28 and 28' which are at right angles to the diametral plane passing through the center of the coupling and the stop pin so that if the clamping ring should turn with the adjusting sleeve, one of the surfaces will engage with the pin and cause the respective end of the ring to be forced radially inwardly against the belt 11 of the male coupling member when the adjusting sleeve is drawn up tight. The clamping ring is thus stopped from further rotation after a slight movement thereof, and additional pressure is applied to the ring so that the coupling members can be most rigidly locked together.

In Figs. 7 and 8 is shown a modified construction. The male coupling member is of substantially the same construction as that shown in Fig. 1. The flange 16 of the female member has substantially mid-way of its lower edge the abutment ridge 29 which forms an abutment for the split clamping ring 30. The clamping or wedging ring 31 has the lower wedging surface 32 for being engaged by the chamfered flange 33 of the adjusting sleeve 34 which threads on flange 16. The inner edge of the upper end of the clamping ring is chamfered to form the wedging surface 35 and the extreme upper edge of the ring is deflected inwardly to form a retaining ridge 36 for the clamping ring, which, by its expansion force, holds itself against the wedging surface 35 and the ridge 36. When the clamping ring is normal, it will be outside of the groove 13 in the belt 11 of the male member so that the coupling members may be disconnected. However, when the adjusting sleeve 34 is drawn up, the engagement of surface 32 with the clamping ring will cause radial contraction of the clamping ring and also movement thereof toward the female member. The split ring 30 will be stopped by the abutment ridge 29 so that the surface 35 will force this ring into the groove 13 to thus lock the coupling members against separation. When the adjusting ring is drawn up tightly, the clamping ring 31 will frictionally engage with the belt 11 and the coupling members will also be locked against relative rotational movement. A retainer nut 23 may be provided as in the construction of Fig. 1 to prevent entire withdrawal of the adjusting ring.

I thus provide a simple coupling which may be efficiently used for coupling two members together and which, by the mere turning in one direction or the other of an adjusting ring, may be rigidly locked against any relative movement, or may be set to allow more or less free relative rotational movement although locked against separation. As before stated, the coupling is particularly adaptable for use in connection with suction cleaning devices, the male member then preferably forming the stem of the nozzle so that different nozzles, each with a coupling stem thereon, may be interchangeably connected with the female coupling member.

As changes and modifications are possible, I do not desire to be limited to the exact construction and operation shown and described, and

I claim the following:

In a coupling, the combination of a female coupling member having a flange at its end provided with a wedging surface, a male coupling member fitting into said female coupling member, an adjusting ring having threaded engagement with said female coupling member flange and having a wedging surface opposed to said coupling member wedging surface, a split clamping ring interposed between said wedging surface and surrounding said male coupling member whereby rotation of said adjusting sleeve to bring said wedging surfaces toward each other will cause radial contraction of said clamping ring and clamping thereby of said male coupling member, and a locking pin extending from the flange of said female coupling member to the gap between the ends of said split clamping ring to prevent rotation of said ring with reference to the female coupling member, the ends of said ring adjacent said gap being tapered to form wedging surfaces for said locking pin to be engaged by said pin upon primary slight rotation of said ring whereby the engaged ring end is forced radially inwardly against said male coupling member.

In witness whereof, I hereunto subscribe my name this 7th day of December, A. D., 1912.

WILLIAM S. SUTTON.

Witnesses:
R. H. BROWN,
LOUISE LAWRENCE.